United States Patent
Ferguson et al.

(10) Patent No.: US 6,639,607 B1
(45) Date of Patent: Oct. 28, 2003

(54) GRAPHICAL USER INTERFACE FOR A LOGIC ANALYZER WHICH ALLOWS TRIGGER CONSTRUCTION FOR DATA COMMUNICATIONS PACKETS AND PROTOCOLS

(75) Inventors: Scott R Ferguson, Colorado Springs, CO (US); Daniel James Ojennes, Colorado Springs, CO (US)

(73) Assignee: Agilent Technologies, Inc., Palo Alto, CA (US)

(*) Notice: Subject to any disclaimer, the term of this patent is extended or adjusted under 35 U.S.C. 154(b) by 474 days.

(21) Appl. No.: 09/616,747

(22) Filed: Jul. 14, 2000

(51) Int. Cl.[7] .................................................. G09G 5/00
(52) U.S. Cl. ...................................... 345/734; 345/969
(58) Field of Search ................................. 345/734–738, 345/969, 804–805; 709/220–226

(56) References Cited

U.S. PATENT DOCUMENTS

| | | | | |
|---|---|---|---|---|
| 4,972,138 A | * | 11/1990 | Bush .......................... 324/73.1 |
| 5,850,388 A | * | 12/1998 | Anderson et al. ............. 370/252 |
| 5,905,963 A | * | 5/1999 | Lysejko ........................ 455/557 |
| 5,941,995 A | * | 8/1999 | Morrison ....................... 714/39 |
| 6,104,924 A | * | 8/2000 | Shirai ........................... 455/418 |
| 6,219,050 B1 | * | 4/2001 | Schaffer ....................... 345/853 |
| 6,330,005 B1 | * | 12/2001 | Tonelli et al. ............... 345/735 |
| 6,505,246 B1 | * | 1/2003 | Land et al. .................. 709/224 |

* cited by examiner

Primary Examiner—Kristine Kincaid
Assistant Examiner—Le Nguyen
(74) Attorney, Agent, or Firm—Regan L. Trumper

(57) ABSTRACT

A trigger function display system for trigger definition development in a signal measurement system having a graphical user interface. The system displays a plurality of graphically selectable icons and an associated protocol profile window. The protocol profile window includes at least a protocol descriptor field and a protocol editors field. The user inputs data into the protocol editors field which causes the system to automatically construct a series of trigger primitives utilizing a plurality of event definitions stored in memory. The event definitions are two bit blocks resulting from the parsing of protocol definition text files.

21 Claims, 11 Drawing Sheets

DESTINATION ADDRESS: 48 BITS: 11-XX-XX-11-XX-XX-XX
SOURCE ADDRESS: 48 BITS: XX-XX-XX-XX-XX-XX-XX
LENGTH TYPE: 16 BITS: XXXX

FIG. 4A

| DATA BIT BLOCK | DON'T CARE MASK |
|---|---|
| 11 | 00 |
| 00 | ff |
| 00 | ff |
| 11 | 00 |
| 00 | ff |
| 00 | ff |
| 00 | ff |
| 00 | ff |
| 00 | ff |
| 00 | ff |
| 00 | ff |
| 00 | ff |
| 00 | ff |
| 00 | ff |

FIG. 4B

DESTINATION ADDRESS: 48 BITS: XX-XX-XX-11-XX-XX-XX
SOURCE ADDRESS: 48 BITS: XX-XX-XX-XX-XX-XX-XX
LENGTH TYPE: 16 BITS: 0800

FIG.4C

| DATA BIT BLOCK | DON'T CARE MASK |
|---|---|
| 11 | 00 |
| 00 | ff |
| 00 | ff |
| 11 | 00 |
| 00 | ff |
| 00 | ff |
| 00 | ff |
| 00 | ff |
| 00 | ff |
| 00 | ff |
| 00 | ff |
| 00 | ff |
| 08 | 00 |
| 00 | 00 |

FIG.4D

GRAPHICAL USER INTERFACE FOR A LOGIC ANALYZER WHICH ALLOWS TRIGGER CONSTRUCTION FOR DATA COMMUNICATIONS PACKETS AND PROTOCOLS

FIELD OF THE INVENTION

The present invention relates generally to logic analyzers used in measurement of data in digital data switching systems, such as routers, switches and hubs that carry communication data on parallel buses, and more particularly to user interfaces and to configuring a logic analyzer to trigger on data communications packets and constructs within selected protocols.

BACKGROUND OF THE INVENTION

As known by those skilled in the art, a logic analyzer is an electronic instrument used to detect, analyze, and display digital signals. Logic analyzers are commonly used to debug the internal operation of digital data switching systems such as routers, switches, and hubs. These digital data switching systems carry communication data on parallel buses. Inside the switching systems, a commercial network or protocol analyzer is of no use, as the protocols used internally are often non-standard, and the buses cannot be connected to the network interfaces of protocol analyzers.

Logic analyzers are digital data acquisition instruments that allow an operator to acquire and display digital signal data from a large number of logic signals, such as those that travel over address, data and control lines of a device under test ("DUT"). A device under test may include one or more separately packaged devices such as those noted above as well as other circuits and devices.

The logic signals are acquired from the device under test on hardwired lines referred to as channels. The channels may be physically assembled into groups commonly referred to as pods. The received signals are sampled and digitized to form signal data. Digitizing typically includes comparing a voltage magnitude of each logic signal sample to a reference voltage to determine the logical state of the signal. Sampling may occur at one of a number of selectable rates, depending on the frequency at which the sampled signals change logic states. The resultant signal data are stored, under the control of a sampling clock, in a signal data memory generally having a fixed size. The data are typically stored sequentially such that consecutive signal samples are stored in consecutive memory locations. Due to the quantity of signal data, signal data memory is commonly implemented as a wrap-around buffer.

Selection of the signal data to be subsequently presented on a display is determined by an operator-defined trigger specification. The trigger specification (also referred to as a trigger set-up) is specified generally by a trigger definition, and a number of parameters collectively referred to as trigger control parameters or, simply, trigger controls. The trigger definition identifies the occurrences that result in signal data being stored.

A trigger definition, which may be a trigger sequence, is comprised of one or more trigger sequence levels. Each sequence level may include any number of trigger branches, each of which sets forth a branch condition that causes the logic analyzer to execute the action defined in that trigger branch. Such execution results in the storage of signal data or further processing of a subsequent sequence level. The final branch condition that causes the acquisition of signal data is commonly referred to as a trigger condition.

Branch conditions are specified by the occurrence of one or more events. An event is defined as an occurrence of certain characteristics or properties of a signal, such as a rising or falling edge of a signal, a logic high or logic low signal state, etc. Events may also be defined based on internal resources, such as internal timers, counters, etc. Typically, a branch condition specifies a number of events that occur simultaneously or in a relative time sequence.

After the trigger specification is specified, the operator can perform a measurement, that is, initiate acquisition of signal samples. When signal data capture is initiated, the signal data is compared to the specified trigger definition. When the trigger definition is satisfied, the signal data is captured in accordance with the specified trigger controls and stored in signal data memory. Subsequently, the signal data memory may be sequentially accessed and the signal data memory displayed.

Constructing a trigger definition can be very complicated and time consuming. Conventionally, trigger definitions are expressed in esoteric trigger programming language. Learning such a programming language is often difficult and inconvenient. However, even with such proficiency and knowledge, formulation of even simple trigger definitions still requires considerable time and effort due to the complexity of the programming language. In other words, such programming languages, although suited for development of complicated trigger definitions, are burdensome to developing simple and complicated trigger definitions alike.

Logic analyzers provide many configuration functions as a result of the increasing operational complexity of target devices. In many measurement applications, however, not all of the configuration functions are needed to obtain simple measurements, that is, the necessary configuration functions are selected in accordance with the level of measurement complexity. Also, the complexity involved in configuring a logic analyzer to properly trigger on a desired communications packet or protocol leads to uncertainty. There are many different ways a user could incorrectly configure the trigger setup, thus leading to doubts as to whether the event being sought for analysis actually happened, or whether the logic analyzer is configured incorrectly.

Conventional logic analyzers include a graphical user interface that allows a user to make selections with respect to the configuration functions. In prior art logic analyzers, the user is required to make selections with respect to all the configuration functions, even if the desired measurements do not require some of the configuration functions. In prior art logic analyzers, trigger configuration displays generally have a setup window and a number of selectable tabs such as: a sampling tab; a format tab; a trigger tab; and a symbol tab. Selection of the trigger tab causes the typical graphical user interface to display a trigger sequence selected by the user. As an example, the user can configure the logic analyzer to trigger when an Internet Protocol packet destined for the IP address 15.19.4.195 crosses the particular bus then being probed. The process requires the user to program the logic analyzer using a sequence of trigger primitives. Each portion of the trigger sequence must be manually constructed by the user. The trigger sequence contains many steps. The first primitive requires the user to configure the first part of the trigger to recognize the Start of Packet bit in a data stream, then, step 2 will be sequenced. Primitive 2 requires the user to set the configuration so that the logic analyzer will look at a specific number of clock cycles and then go to primitive 3 regardless of the content. This requires the user to have intimate knowledge of the construction of data protocols and, accordingly, to know how many clock cycles will occur before data of import to the specific sequence of interest will occur. In the next primitive, the user must set the configuration so that if a particular value occurs on the bus for a predetermined number of times, then sequence will step to the next primitive, otherwise the sequence will start over at primitive 1. The process of constructing individual primitive continues until the user has constructed a sequence to trigger on exactly the desired protocol construct for IP address 15.19.4.195.

In the above example, it is noteworthy that the user must also make mental conversions from the hex representations of the IP address to the digital representation. IP addresses are commonly represented as a series of decimal coded hex numbers, such as 15.19.3.116. In the above example, the hex numbers 0F13 0374 must be mentally converted to the digital—15.19.3.116.

These necessary configuration function-setting operations are time-consuming and increase the possibility of error in setting the trigger configuration. There are numerous ways in a user could incorrectly configure the trigger setup, leading to doubt as to whether the event being sought actually happened, or if the logic analyzer is simply misconfigured. The complex array of configuration settings renders the setup of the logic analyzer confusing to unskilled or unfamiliar users of the logic analyzer.

SUMMARY OF THE INVENTION

The present invention is a system and method for configuring a logic analyzer to trigger on data communications packets and constructs within selected protocols. The present invention is useful for debugging data flow on a communication bus (such as ATM or Ethernet) or any other bus with a communication protocol (such as PCI). The present invention is useful in converting the constructs within selected into a trigger sequence.

In accordance with the invention, a system and method is provided whereby the normally complex array of configuration settings necessary for a logic analyzer trigger definition is simplified. Protocol definitions are created and stored in a shared database. The protocol definitions are parsed into data structures for each particular protocol. The data structures are then used by a trigger mechanism to create two blocks of data—a data bit block and a "don't care" mask block. This pair of bit blocks is stored in memory. Together, this bit block pair comprises an event definition.

Once the event definition is stored, it can be used to create a logic analyzer trigger definition. A trigger definition is comprised of one or more trigger functions. Each trigger function is a graphical representation of an underlying one or more trigger primitives. A trigger primitive is translated into a form suitable for controlling the signal measurement system. Trigger primitives comprise one or more trigger branches used to form a sequence level of the trigger definition. For a selected trigger function, either the trigger function or its underlying trigger primitives are displayed in a trigger definition region of the display window for editing by the operator.

In one aspect of the invention, a user configures a logic analyzer trigger sequence by using an event editor. The event editor is presented to the user in a graphical user interface that allows the user to use protocol definitions to describe an event of interest. The logic analyzer converts the event of interest selected by the user into a series of primitives. This series of primitives results in a trigger sequence used by the logic analyzer to capture and store bus data.

Various embodiments of the present invention provide certain advantages and overcome certain drawbacks of the conventional techniques. Not all embodiments of the invention share the same advantages and those that do may not share them under all circumstances. Further features and advantages of the present invention as well as the structure and operation of various embodiments of the present invention are described in detail below with reference to the accompanying drawings. In the drawings, like reference numerals indicate identical or functionally similar elements.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 4a is an example of an Ethernet packet header.

FIG. 4b is an example of a data block in accordance with the invention.

FIG. 4c is an example of an Ethernet packet header.

FIG. 4d is an example of a data block in accordance with the invention.

DESCRIPTION OF PREFERRED EMBODIMENT

The present invention is directed to signal measurement systems that acquire and store signal data in accordance with a trigger specification. The present invention is a system and method for configuring a signal measurement system, such as a logic analyzer, to trigger on data communications packets and constructs within selected protocols. That is, the present invention presents a system and method that simplifies constructing trigger definitions for logic analyzers. Further, the present invention provides a graphical user interface whereby a user can construct said trigger definitions. Specifically, the present invention displays an event editor graphical user interface enabling construction of trigger definitions through use of protocol definitions stored in memory.

Figure 1:
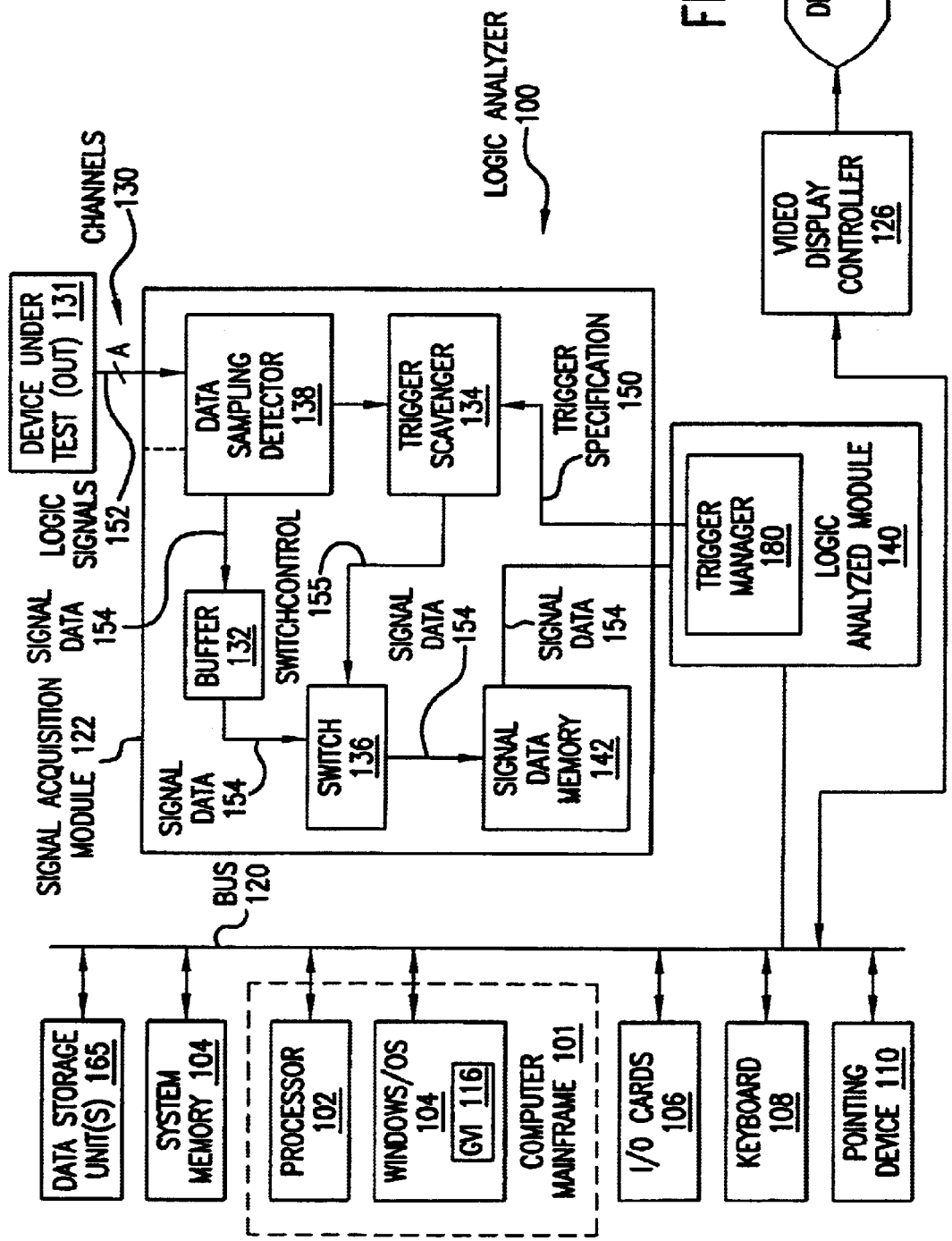
FIG. 1 is a block diagram of an exemplary logic analyzer in which the present invention can be implemented.

FIG. 1 is a functional block diagram of a typical logic analyzer. Logic analyzer 100 acquires, analyzes and displays a wide variety of signals generally in terms of the logic level of the signals versus time. In the illustrative embodiment, logic analyzer 100 includes a general-purpose computer system, which is programmable using a high-level computer programming language, and specially programmed, special purpose hardware for performing signal acquisition, analysis and display functions. It become apparent from the following description that the present invention may be implemented in other environments such as a special purpose program operating on on-board processors, ASICs, firmware, hardware, or a combination thereof.

Logic analyzer 100 includes processor 102, system memory 104, input/output (I/O) cards 106, storage units 165 such as a hard disk drive, floppy disk drive, etc. Analyzer may also include one or more user input/output devices such as keyboard 108, pointing devices 110 and display 112. System memory 104 is used for storage of program instructions in addition to other computer-readable programs and data. In a preferred embodiment, system memory 104 includes random access memory (RAM). Display 112 is preferably a cathode ray display and is logically or physically divided into an array of picture elements (pixels). Input/output (I/O) interface cards 106 may be modem cards, network interface cards, sound cards, and the like.

Processor 102 is typically a commercially available processor, such as the to PA-RISC processor from Hewlett-Packard Company, Pentium microprocessor from Intel Corporation, or PowerPC and 68000 series microprocessors from Motorola. Many other processors are also available. Such a processor executes a program referred to as an operating system 114, providing a graphical user interface (GUI) 116 and a windowing system, such as the various versions of the Windows operating systems from Microsoft Corporation, the NetWare operating system available from Novell, Inc., or the Unix operating system available from many vendors such as Sun Microsystems, Inc., Hewlett-Packard Company and AT&T. The operating system 114 controls the execution of other computer programs such as software embodiments of logic analysis module 140, and provides scheduling, input-output control, tile data management, memory management, and communication control and related services. Processor 102 and operating system 114, generally define a computer platform shown by dashed block 101, for which application programs in high level programming languages may be written. The functional elements of logic analyzer 100 communicate with each other via system bus 120.

Signal acquisition module 122 contains circuitry and software that samples and digitizes logic signals 152 from device under test 131. Signal acquisition module 122 receives logic signals 152 from device under test 131 via channels 130. Signal acquisition module 122 includes a data sampling detector 138 that receives and digitizes logic signals 152. Preferably, samples of logic signals 152 are obtained at regular time intervals. The time interval may be user-specified or synchronized with one of the logic signals 152 received from device under test 131, such as a clock signal generated by DUT 131. Signal data 154 is a sampled and digitized representation of logic signals 152. The signal data acquisition module 122 also includes a buffer 132 that receives and temporarily stores signal data 154 from data sampling detector 138.

A trigger sequencer 134 selects the portion of signal data 154 for subsequent storage and display based on an operator-defined trigger specification 150. As noted, trigger specification 150 is specified generally by two parameters, a trigger definition that identifies the occurrences under which signal data is to be stored and a trigger position that identifies the relative position of the occurrence defined by the trigger definition. Trigger sequencer 134 stores in memory a predetermined quantity of signal data occurring before and after the specified occurrence. Trigger sequencer 134 provides switch control signal 152 to switch 136.

Trigger sequencer 134 also determines that trigger specification 150 has been achieved and provides a data collection termination 160 signal to logic analysis module 140 to indicate that display of sample logic signals 152 is to be performed. After the data collection termination signal 160 is generated, switch control signal 152 controls switch 138 to cease storing signal data 154 in signal data memory 142.

Logic analyzer 100 also includes a video display controller 126. Computer platform 101 drives video display controller 126 using standard windows applications program interfaces (API) and display data from logic analysis module 140 to the operator on display 112 under the control of video display controller 126.

Logic analysis module 140 includes trigger manager 180 that provides the operator with the ability to create and modify trigger specifications for capturing desired signal and bus information occurring at channels 130. Trigger manager 180 also enables the operator to store such trigger specifications and to recall stored trigger definitions for subsequent use and modification.

Figure 2:
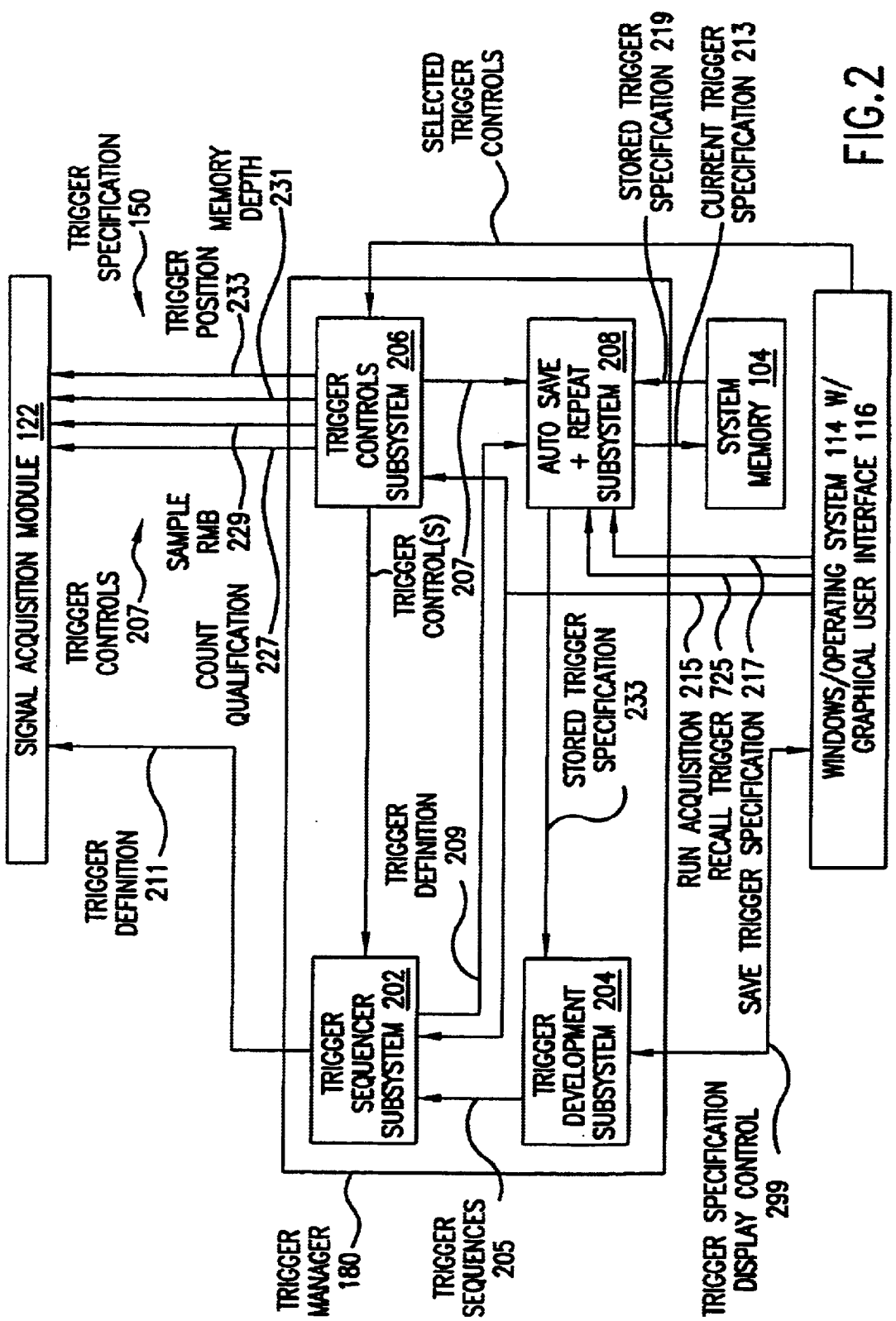
FIG. 2 is a block of an embodiment of a trigger manager.

FIG. 2 is a functional block diagram of one embodiment of trigger manager 180. Trigger manager 180 is shown to primarily include four functional subsystems or components. Specifically, trigger manager 180 includes a trigger development subsystem 204 that provides the operator with an ability to develop trigger specifications. Trigger development subsystem 204 presents various displays on graphical user interface 116 to create an interactive and intuitive trigger development environment.

A trigger sequencer subsystem 202 receives trigger sequences 205 from trigger development subsystem 204 and translates trigger sequences 205. Trigger sequencer 202 generates trigger definition signals 211 suitable for controlling signal acquisition module 122. The trigger development subsystem 204 sends and receives a trigger specification display control 299 from the windows/operating system 114 w/graphical user interface 116. The trigger sequencer subsystem 204 also sends a trigger definition 209 to the auto save+repeat subsystem 208. The auto save+repeat subsystem 208 also receives a save trigger specification 217, run acquisition 215 and recall trigger 725 input from the windows/operating system 114 graphical user interface 116. The system memory 104 sends a stored trigger specification 219 to the auto save+repeat subsystem 208. The auto save+repeat subsystem 208 sends a current trigger specification 213 to the system memory 104.

Trigger controls subsystem 206 enables the operator to specify the characteristics of the captured data, and provides such trigger control parameters 207 to signal acquisition module 122. Trigger controls 207 include, for example, count qualification 227, sample rate 229, memory depth 231 and trigger position 233. These controls are considered to be well known in the art.

To facilitate a clear understanding of the present invention, a few definitions are set forth below. A trigger definition is comprised of one or more "trigger primitives" translated by trigger sequencer subsystem 202 into a form suitable for controlling the signal acquisition module 122. Trigger primitives are generally of a common form recognized by those skilled in the art as an "if/then" statement, and may optionally include any predetermined number of trigger branches. Each trigger branch includes and "if" statement defining a branch condition and a "then" statement defining the activity to be performed following an affirmative completion of the branch condition ("action"). Trigger primitives forming a trigger definition may be displayed for editing by the operator. A trigger definition may alternatively be represented by a "trigger function(s)." A trigger function is a graphical representation of one or more underlying trigger primitives. The graphical nature of the trigger function facilitates operator comprehension and editing of the underlying trigger primitive(s).

Figure 3:
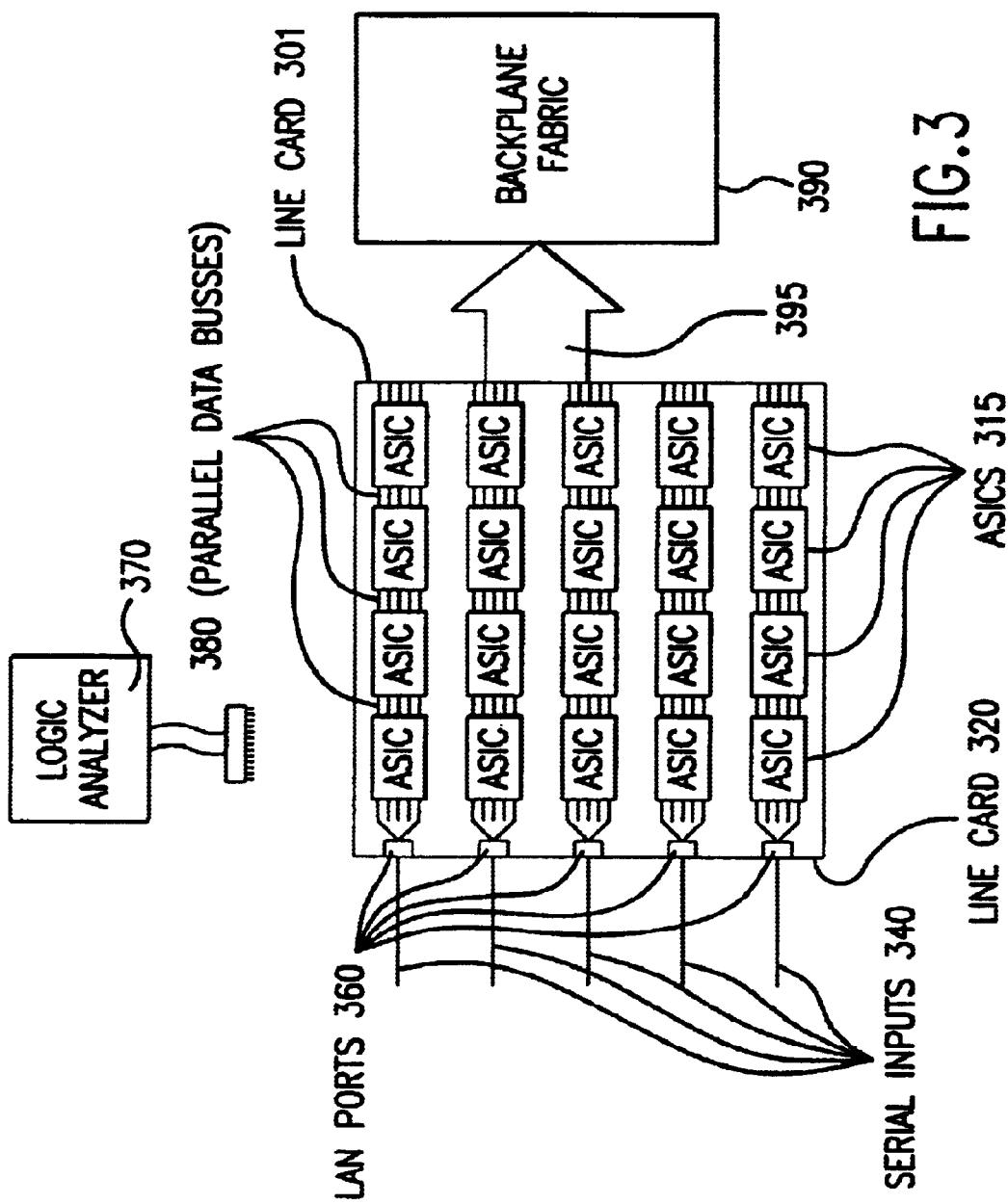
FIG. 3 is a block diagram of a device under test and a logic analyzer.

FIG. 3 is a simplified block diagram of a typical line card commonly used in a digital data switching system. The digital data switching system can be any router, switch, hub or other communications device receiving and transmitting data. The Line Card 301 in FIG. 3 includes serial inputs 340, LAN ports 360, parallel data buses 380, ASICs 315 and a connection 395 to the back-plane fabric 390 of the digital data switching system. Serial inputs 340 carry serial serial data (bit streams) to LAN ports 360. The bit streams can be any type of communications data such as IEEE 802.3, Ethernet II, SNAP, Apple Talk ELAP, ATM, etc. Each LAN port 360 is physically connected to a serial input 340. The bottom layer protocol for a particular LAN port 360 is constant, i.e. connection specific. For instance, a first LAN port 340 can be connected to an Ethernet II connection and a second LAN port 340 can be connected to an ATM connection. The bottom layer protocol for the first LAN port 340 will always be Ethernet II and the bottom layer protocol for the second LAN port 340 will always be ATM.

Each LAN port 340 receives serial bit stream data from serial inputs 340. LAN port 340 translates the serial bit stream to parallel data bus 380. Parallel data bus 380 can range anywhere from 4 up to 256 bits wide. The parallel data bus 380 passes the data to ASIC 315. The data on the parallel data buses 380 will pass through the line card 301, with each ASIC 315 performing a specific task on the data.

Logic analyzer 370 acquires, analyzes and displays data passing on parallel data buses 380. As is well known in the art, logic analyzer 370 is commonly used to debug the parallel data buses 380. Logic analyzer 370 probes any of parallel data buses 380. For instance, corrupted data can exist somewhere on line card 301; e.g., data from serial input 340 on Ethernet LAN port 360 is being corrupted. By probing parallel data buses 380 for the LAN port 360 associated with corrupted Ethernet data, logic analyzer 370 is useful in determining where the trouble spot exists. It is recognized by those skilled in the art that utilization of a logic analyzer or any other signal measurement device is not limited to line cards.

In accordance with one aspect of the invention, logic analyzer 370 is configured to trigger on a data communications packet or construct within selected protocols crossing parallel data bus 380. Logic analyzer 370 translates the data stream into protocol information and decodes the data stream, as is well known in the art. Logic Analyzer 370 computes a trigger sequence based on inputs that the user enters into an event editor, discussed in connection with FIG. 4 below. Text files representing protocol definitions are entered and stored in memory in logic analyzer 370.

Appendix A is an example of a portion of a protocol definition text file. Software located in the system memory 104 is accessed by processor 102 to parse the protocol definition text file. The software parses the text file and creates data structures for each protocol definition. The text file is parsed using methods known in the art, such as Yacc and Lex. For each field in the header, the data structure contains the following information:

1. Field Name
2. Field size (in bits)
3. Favorite data format for display of this field Hex
    Octal
    Decimal
    Internet IP Address (i.e., 1.19.4.19)
    Ethernet Hardware Address (i.e., 11-22-33-44-55-66)
4. Field "type"
    Data Field
    "Protocol Indicator" (indicates content of the payload)

A software trigger mechanism uses the resulting data structures to create two blocks of data.

1. Data Bit Block—The values of the bits in the packet header.
2. Don't Care Mask Block—A "don't care" mask.

For example, FIG. 4a shows an Ethernet packet header and FIG. 4b shows the resulting data blocks. All of the values in FIGS. 4a and 4b are in hexadecimal format; i.e. each hexadecimal digit is equivalent to four bits of binary so that hexadecimal 1 translates to binary 0001. An X indicates a "don't care" digit. In the example, Ethernet header information in FIG. 4a, the first and fourth bytes in the Destination address are the only bytes of interest. In configuring a trigger sequence, the trigger mechanism accesses data on a parallel bus that has a bottom layer Ethernet protocol. The trigger mechanism does not care about the values the other bytes in the header.

In FIG. 4b, all bytes are set to zero except for the first and fourth bytes. The "don't care" mask block is set so that each bit is set to 1 for each bit that is not cared about. Thus, in the example, all bits except those for the first and fourth bytes are set to 1 (ff in hex corresponds to 11111111 in binary). Conversely, when the "don't care" bit is set to zero, then the value in the data bit block are used to construct the trigger setup.

FIGS. 4c and 4d show another example of a trigger setup and bit block creation. Using our protocol definitions from FIGS. 4a and 4b, if the desired trigger is an Internet Protocol packet, then the value of 0800 needs to be added to the Length/Type field. The Destination Address and Source Address would remain the same and the last 16 bits of the header would be changed to 0800 hex. The Data Bit Block would also contain the value of 08 00 in the last two locations and the last two locations of the "don't care" Mask Block would contain 00 00. Thus, the values of 0800 would be used in the trigger sequence rather than not being used.

Figure 5:
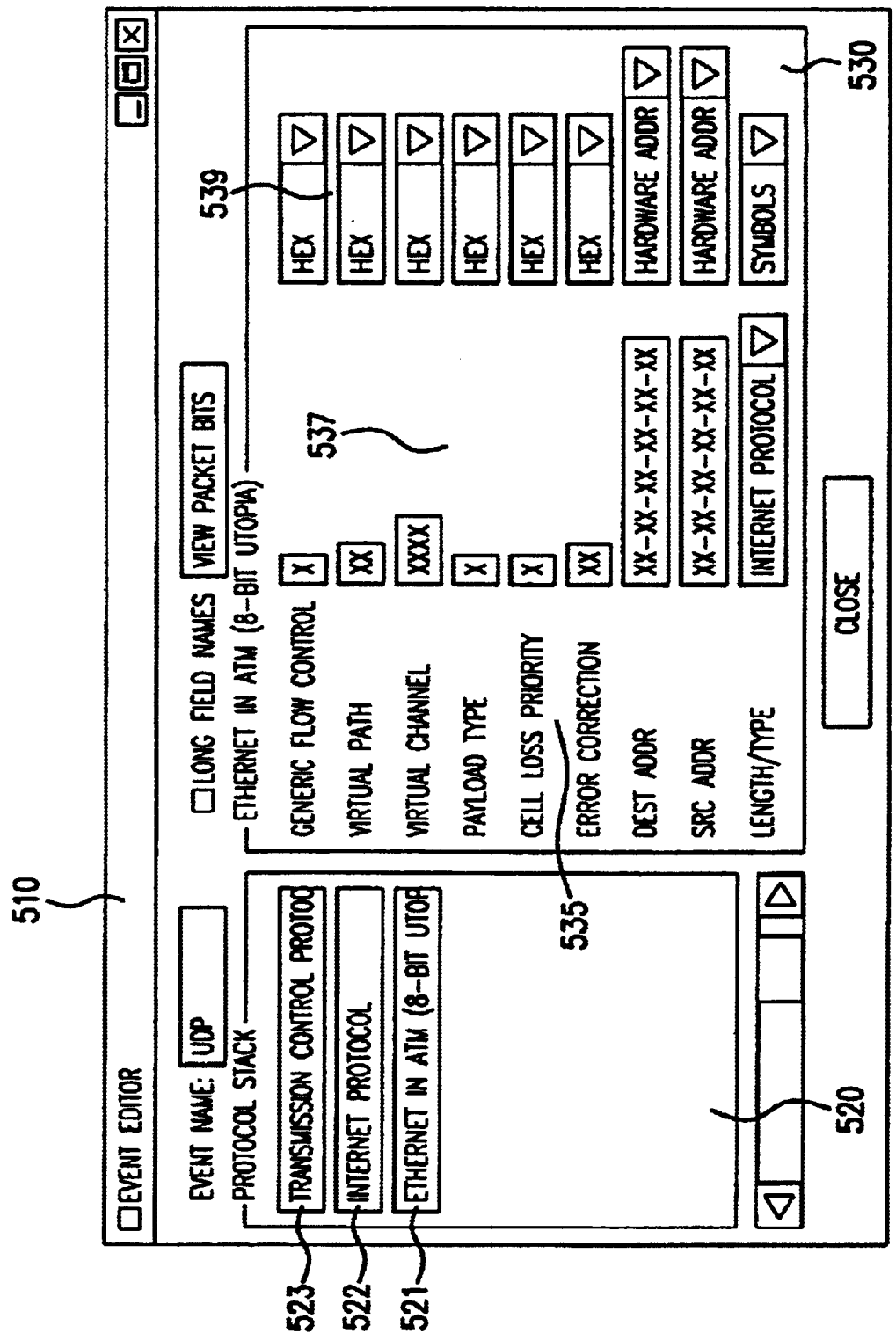
FIG. 5 is an Event Editor graphical user interface in accordance with the invention.
Figure 6:
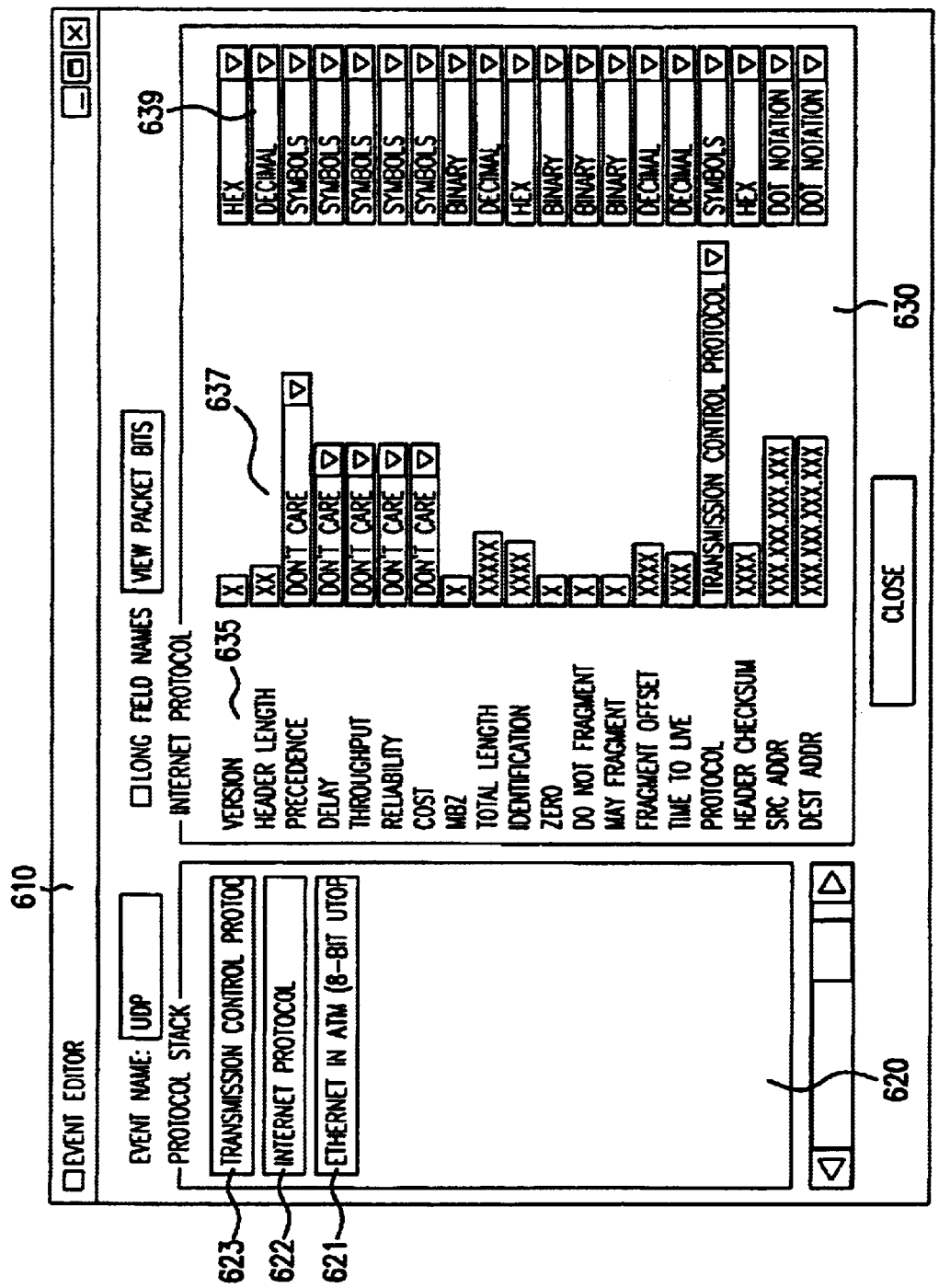
FIG. 6 is an Event Editor graphical user interface in accordance with the invention
Figure 7:
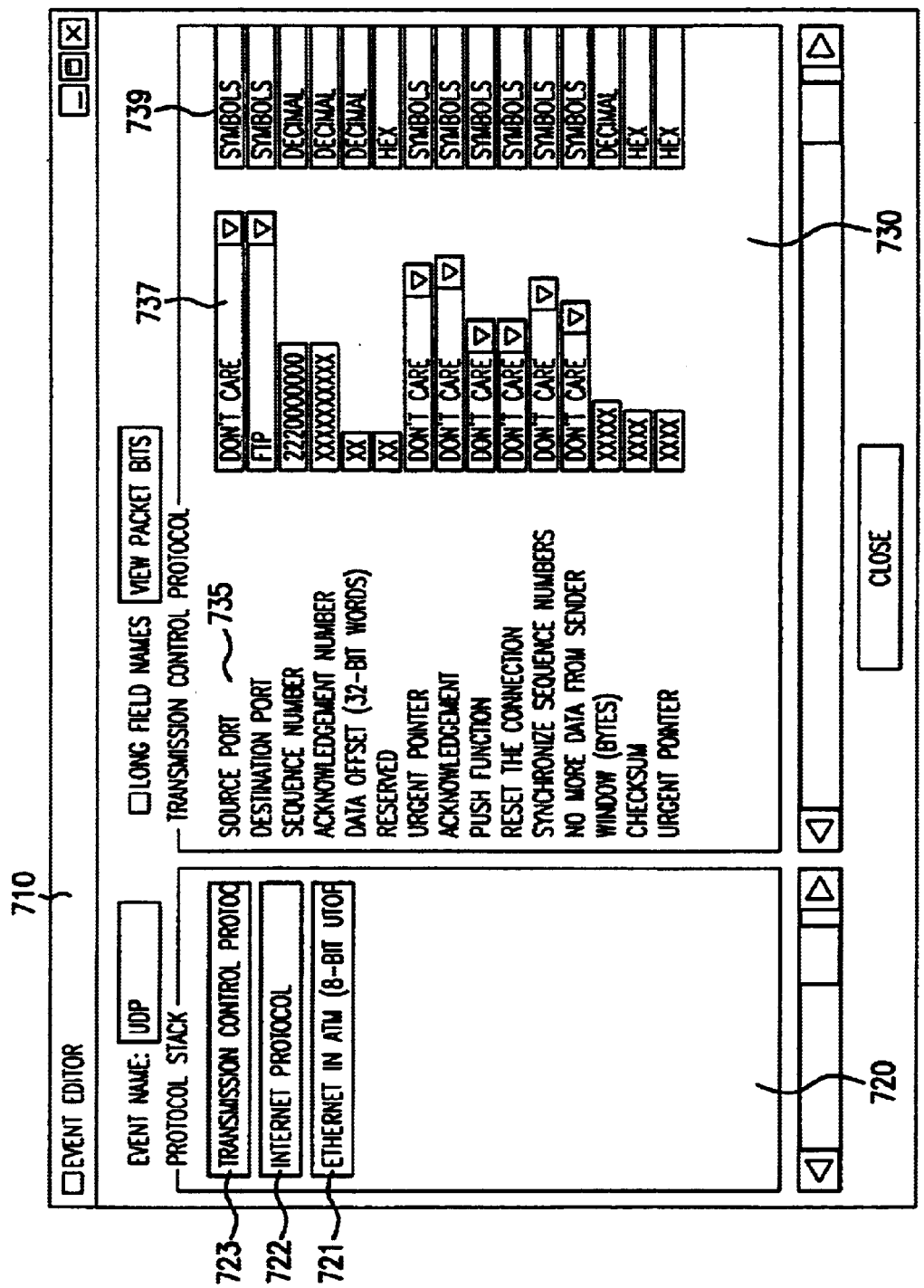
FIG. 7 is an Event Editor graphical user interface in accordance with the invention.

A logic analyzer trigger sequence is created from the event definitions and stored as pairs of bit blocks. FIGS. 5, 6 and 7 show a series of Event Editor graphical user interfaces useful for defining logic analyzer trigger. FIG. 5 shows an event editor window 510, a protocol stack window 520 and a field editing window 530. Protocol stack window 520 shows three graphically selectable protocol layer icons 521 522 523. In the example shown in FIG. 5, graphically selectable layer icon 521 represents the bottom layer protocol of a bit stream received at any particular LAN port consistent with the examples used herein. This example shows the bottom layer protocol as Ethernet in ATM (8-bit Utopia). It is understood that the bottom layer protocol could be any communication protocol. It is also understood that the windows in FIG. 5 are sizeable according to user preference in typical windows fashion. Field editing window 530 displays a protocol descriptors menu 535 of header information for bottom layer protocol Ethernet in ATM (8-bit Utopia). Each item in the protocol descriptors menu 535 is adjacent to an input field 537. Each input field 537 allows the user to input desired values. For instance, if the user desires to configure the trigger sequence for Ethernet in ATM (8-bit Utopia) with a particular virtual channel, a particular value is entered in input field 537. Each input field 537 is adjacent to a format field 539. Each format field 539 allows the user to specify the format in which the input fields are displayed. Formats can be hexadecimal, binary, hardware addresses, symbols, decimal, dot notation or any other format capable of representing communications, or other, data. In the example in FIG. 5, "Internet Protocol" is selected in the particular input field 537 for the Length/Type item 535. The input field for Length/Type is displayed in symbol format. Each other input field 537 has an X value indicating that the trigger sequence does not care about that particular value in the Ethernet in ATM (8-bit Utopia) header.

FIG. 6 shows the Event Editor 610 with the Internet Protocol layer protocol descriptors menu 635 and protocol editors menu 637 displayed in the protocol window 630. Column 639 shows the format of the data in the protocol editors menu 637. Protocol Stack 620 shows the Ethernet in ATM (8-bit Utopia) graphically selectable icon 621 below graphically selectable Internet Protocol icon 622 which is in turn below the selectable Transmission Control Protocol icon 623. Graphical selection of the Ethernet in ATM (8-bit Utopia) icon 621 displays Event Editor display 510 shown in FIG. 5. Graphical selection of the Internet Protocol icon 622 displays Event Editor display 610 shown in FIG. 6. "Transmission Control Protocol" (TCM) is selected in the protocol editors menu is 637 for the "Protocol" field of the protocol descriptors menu 635. FIG. 6 shows the input field for Protocol displayed in symbol format. Each other input field has a value of X or "Don't Care" indicating that the trigger sequence does not care about that particular value in the Internet Protocol header.

FIG. 7 shows the Event Editor 710 with the Transmission Control Protocol layer protocol descriptors menu 735 and protocol editors menu 737 displayed in the protocol window 730. Column 739 shows the format of the data in the protocol editors menu 737. Protocol Stack 720 shows the graphically selectable Ethernet in ATM (8-bit Utopia) icon 721 below Internet Protocol layer icon 722, which is in turn below the graphically selectable Transmission Control Protocol icon 723. Graphical selection of the Ethernet in ATM (8-bit Utopia) icon 721 displays the Event Editor shown in FIG. 5. Likewise, graphical selection of the Internet Protocol icon 722 displays the Event Editor shown in FIG. 6. Graphical selection of Transmission Control Protocol icon 723 displays the Event Editor shown in FIG. 7. FTP is selected in the protocol editors menu 737 for the "Destination Port" field of the protocol descriptors menu 735. Likewise, the value "2220000000" is selected in the protocol editors menu 737 for the "Sequence Number" field of the protocol descriptors menu 735. Each other input field has a value of X or "Don't Care" indicating that the trigger sequence does not care about that particular value in the Internet Protocol header.

As can be seen by the series of Event Editor screens in FIGS. 5, 6, and 7, input of data in certain fields in protocol editors menu 537,637,737 corresponding to certain of the protocol descriptors menu 535, 636 735 produces the next layer icon in the protocol stack window. Accordingly, it is understood that the graphical user interface Event Editors 510, 610, 710 are only representative of the depth and layering possible in the protocol stacks. The graphically selectable protocol stack icons in the protocol stack windows are selectable to the extent of and are limited only by the depth of actual protocol stacks on any particular communications bus.

Figure 8:
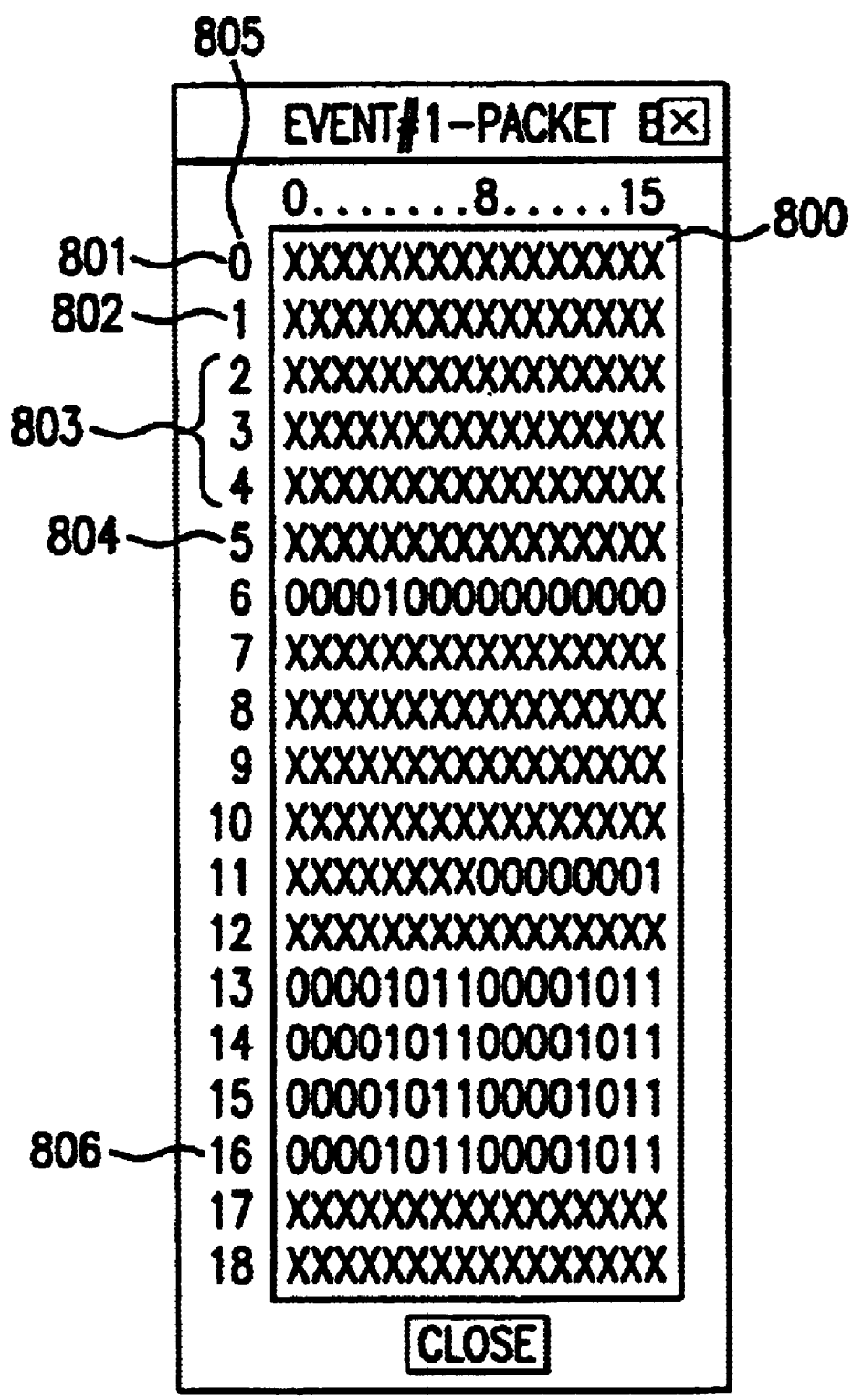
FIG. 8 shows an example of a bit sequence 800 that results from user editing of the graphical user interfaces in FIGS. 5, 6 and 7.

FIG. 8 shows an example of a bit sequence 800 that results from user editing of the graphical user interfaces in FIGS. 5, 6 and 7. Each pattern in the bit sequence 800 has a clock cycle identifier 805 in the left column. This bit sequence 800 does not necessarily correspond to the examples that appear in the graphical user interfaces used as examples throughout this disclosure. The data blocks shown in FIGS. 4b and 4d are used by the invention to construct a bit stream such as the one in FIG. 8a. This bit stream is then used to create a trigger sequence, series of trigger primitives. The series of trigger primitives is constructed by looking at each clock cycle in the bit stream and creating an if-then-else statement which, in essence, looks for that series of bits in a probed data stream. For instance, the first clock cycle is 16 "don't care" digits. For purposes of this discussion, we know that the first cycle of the bit stream in FIG. 8 is a Start of Packet ("SOP") bit. Accordingly, the first primitive 801 that the system of the invention will create is one that looks for a SOP bit. Looking at the next clock cycle 802 in the bit stream, we see that it is a series of "don't care" digits. The second primitive that is created will be one that looks for anything. is Any values of data in a data stream will satisfy this primitive. The same is true for the next four clock cycles 803. Four primitives will be created that look for anything in the data stream. Clock cycle six 804 results in a primitive that looks for "0000100000000000". If this bit occurs sequentially after the series of five "don't care" bits, then the trigger sequence will pass to the next primitive. Otherwise, the trigger sequence will begin again. In the example of FIG. 8, the creation of trigger primitives continues through cycle sixteen 806. At this point, the remainder of the bit series is "don't care" bits. The logic analyzer recognizes this fact and creates the last trigger primitive.

Figure 8A:
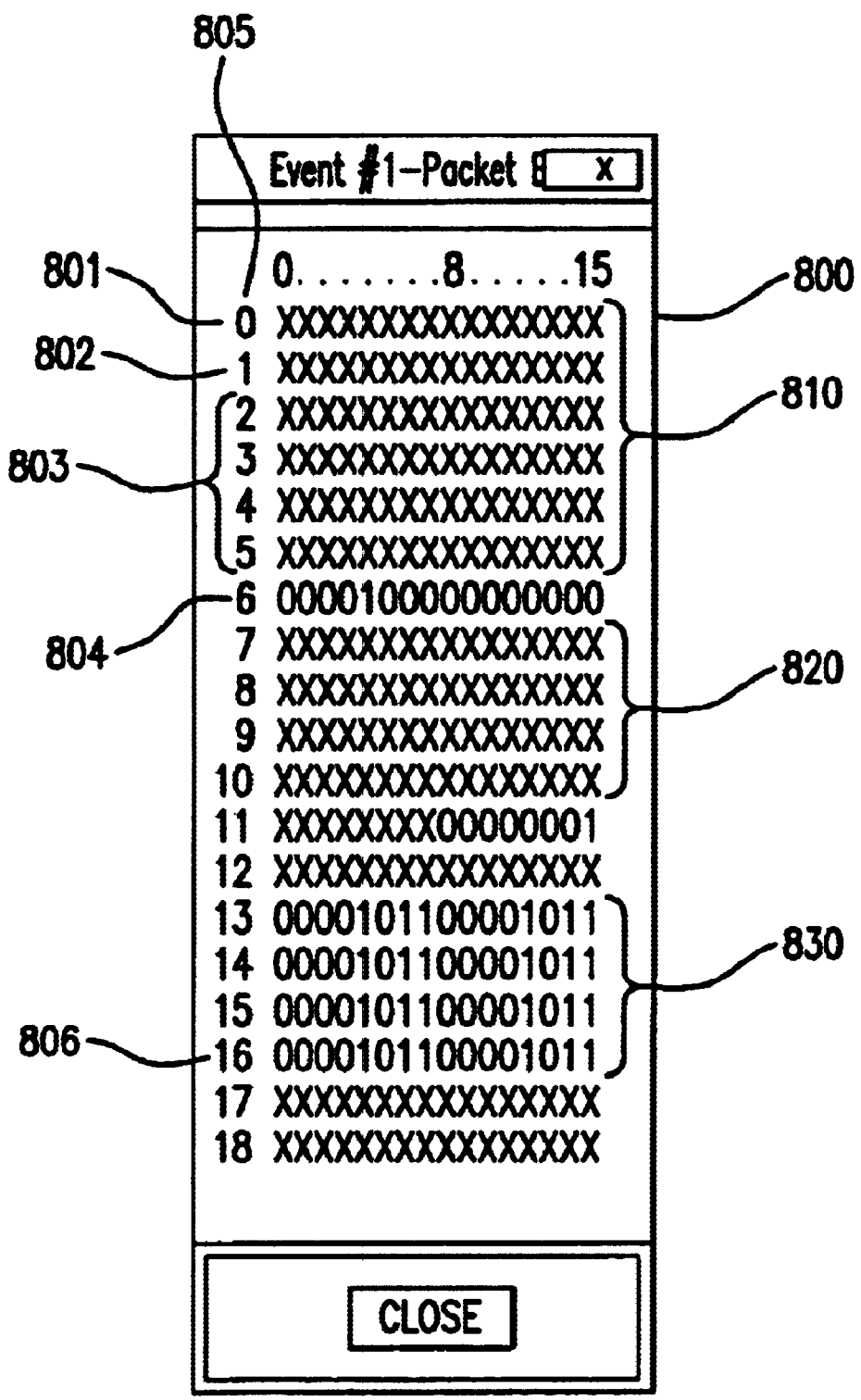
FIG. 8a is an example of a bit sequence constructed by the logic analyzer in accordance with the invention.
Figure 8B:
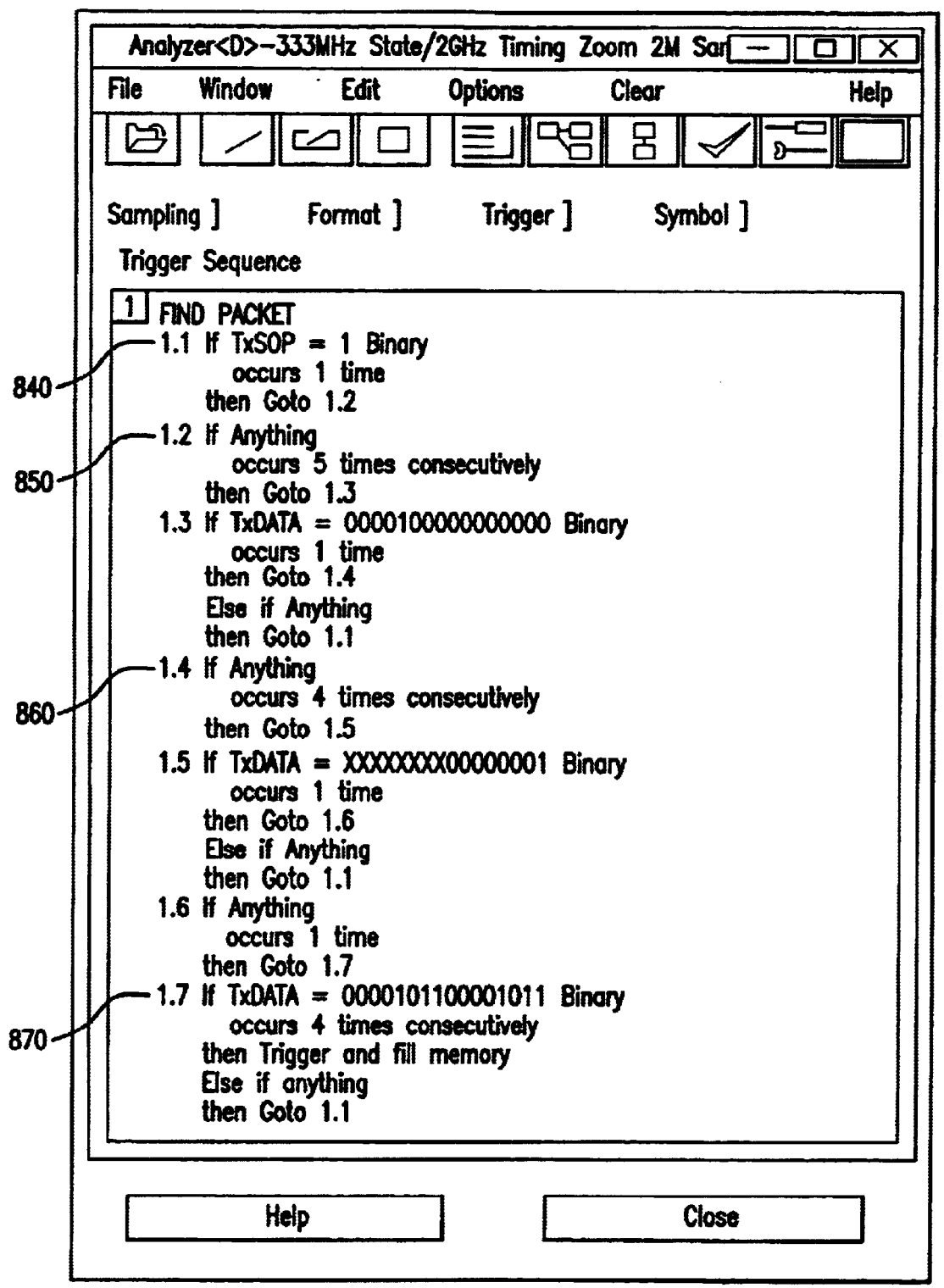
FIG. 8b is an example of a series of trigger primitives constructed in accordance with the invention.

FIG. 8b shows a trigger sequence 840 that results from the bit sequence of FIG. 8a. The optimization routine stored in the logic analyzer determines whether a particular bit pattern in one clock cycle matches the preceding bit pattern in the next clock cycle. The optimization routine counts the number of occurrences of identical bit patterns in a row and utilizes this information when constructing a trigger sequence. For instance, the optimization routine counts five occurrences of a "don't care" pattern at clock cycles 1–5. This pattern of occurrences is then used by the system of the invention to construct a single trigger primitive. A single trigger primitive results for each multiple consecutive occurrence of identical bit patterns. Referring to FIG. 8b, the trigger primitive identified as step 1.2 850 illustrates the resulting primitive. Likewise, the trigger primitive at step 1.4 860 represents the single trigger primitive for the multiple repeating patterns from clock cycles 7–10 820. The trigger primitive at step 1.7 870 represents the single trigger primitive for the multiple repeating patterns from clock cycles 13–16 830. In this way, the system of the invention constructs a simplified trigger sequence by grouping repetitive patterns in the bit sequence 800.

While various embodiments of the present invention have been described above, it should be understood that they have been presented by way of example only, and not limitation. For example, exemplary aspects of the present invention have been described in relation to a logic analyzer. It should be apparent to those of ordinary skill in the art that the present invention may be implemented in any signal measure system that acquires signal data in accordance with a trigger specification. For example, the present invention may be implemented in a digital oscilloscope, protocol analyzer, microprocessor emulator, bit error rate tester, network analyzer, etc. Although reference has been made to a sequence of graphical user interfaces to achieve a result, it is understood that additional or alternative sequence steps may be included to achieve the same or similar result. Additionally, although the illustrated embodiment has been described using a particular object oriented implementation, it is understood that this is by way of example only. The same or similar functionality may be implemented using other object-oriented arrangements as well as structured programming languages, firmware or hardware. Thus, the breadth and the scope of the present invention are not limited by any of the above exemplary embodiments, but are defined only in accordance with the following claims and their equivalents.

APPENDIX A

```
# ---------------------------------------------------------------------
# IEEE 802.3/Ethernet Version II Packet Definition
# ---------------------------------------------------------------------
Protocol
{
    Name "IEEE 802.3 (Ethernet V2)"
    PhysicalLayer 1
    Header
    {
        DA "Dest Addr"           48 HardwareAddress Data
        SA "Src Addr"            48 HardwareAddress Data
        PT "Length/Type"         16 Hex ProtocolIndicator
        {
            "Internet Protocol"           #h0800
            "ARP Request"                 #h0806
            "ARP Response"                #h0835
            "AppleTalk Datagram"          #h809B
            "Novell IPX"                  #h8137
            "IPS"                         #h2007
        }
    }
}
# ---------------------------------------------------------------------
# ARP Request Packet Definition !!!
# ---------------------------------------------------------------------
Protocol
{
    Name "ARP Request"
    Header
    {
        HT "Hardware Type"       16 Hex Symbols
        {
            "Ethernet"            1
        }
        PT "Protocol Type"       16 Hex Symbols
        {
            "Internet Protocol"           #h0800
            "AppleTalk Datagram"          #h809B
            "Novell IPX"                  #h8137
            "IPS"                         #h2007
        }
        HL "HW Address Length"   8 Decimal Data
        PL "Protocol Addr Length" 8 Decimal Data
        OC "Operation Code"      16 Decimal Symbols
        {
            "ARP"      1
            "RARP"     2
        }
        SA "Sender HW Address"   48 HardwareAddress Data
        SP "Sender IP Address"   32 DotNotation Data
        TA "Target HW Address"   48 HardwareAddress Data
        TP "Target IP Address"   32 DotNotation Data
    }
}
# ---------------------------------------------------------------------
# ARP Response Packet Definition !!!
# ---------------------------------------------------------------------
Protocol
{
    Name "ARP Response"
    Header
    {
        HT "Hardware Type"       16 Hex Symbols
        {
            "Ethernet"            1
        }
        PT "Protocol Type"       16 Hex Symbols
        {
            "Internet Protocol"           #h0800
            "AppleTalk Datagram"          #h809B
```

APPENDIX A-continued

```
            "Novell IPX"              #h8137
            "IPS"                     #h2007
        }
        HL "HW Address Length"    8 Decimal Data
        PL "Protocol Addr Length" 8 Decimal Data
        OC "Operation Code"       16 Decimal Symbols
        {
            "ARP"     1
            "RARP"    2
        }
        SA "Sender HW Address"    48 HardwareAddress Data
        SP "Sender IP Address"    32 DotNotation Data
        TA "Target HW Address"    48 HardwareAddress Data
        TP "Target IP Address"    32 DotNotation Data
    }
}
# ------------------------------------------------------------------------
# ICMP Packet Definition
# need to check field lengths !!!
# ------------------------------------------------------------------------
Protocol
{
    Name "Internet Cntrl Msg Protocol"
    Header
    {
        TYP "Type"                            8 Decimal Symbols
        {
            "Echo Reply"                      0
            "Destination Unreachable"         3
            "Source Quench"                   4
            "Redirect (Change Route)"         5
            "Echo Request"                    8
            "Time Exceeded For Datagram"      11
            "Parameter Problem On Datagram"   12
            "Time Stamp Request"              13
            "Time Stamp Reply"                14
            "Information Request"             15
            "Information Reply"               16
            "Address Mask Request"            17
            "Address Mask Reply"              18
        }
        COD "Code"                            8 Hex Data
        CHK "Checksum"                        16 Hex Data
    }
}
# ------------------------------------------------------------------------
# IP (Internet Protocol) Packet Definition
# This packet definition assumes the packet length is 20 bytes
# If the packet header is not this length the next protocols will not work
# At this time variable length headers are not supported
# ------------------------------------------------------------------------
Protocol
{
    Name "Internet Protocol"
    Header
    {
        VE "Version"              4 Hex Data
        IHL "Header Length"       4 Decimal Data
        PR "Precedence"           3 Hex Symbols
        {
            "Routine"             0
            "Priority"            1
            "Immediate"           2
            "Flash"               3
            "Flash Override"      4
            "Internetwork Control" 6
            "Network Control"     7
        }
        DE "Delay"                1 Binary Symbols
        {
            "Normal"   0
            "Low"      1
        }
        TP "Throughput"           1 Binary Symbols
        {
            "Normal"   0
            "High"     1
        }
        RE "Reliability"          1 Binary Symbols
```

APPENDIX A-continued

```
        {
             "Normal"    0
             "High"      1
        }
        CO "Cost"                              1 Binary Symbols
        {
             "Normal"    0
             "Low"       1
        }
        MBZ "MBZ"                              1 Binary Data
        TL "Total Length"                      16 Decimal Data
        ID "Identification"                    16 Hex Data
        ZE "Zero"                              1 Binary Data
        DF "Do not fragment"                   1 Binary Data
        MF "May Fragment"                      1 Binary Data
        FO "Fragment Offset"                   13 Decimal Data
        TTL "Time To Live"                     8 Decimal Data
        PRO "Protocol"                         8 Hex ProtocolIndicator
        {
             "Internet Cntrl Msg Protocol"     1
             "Transmission Control Protocol"   6
             "User Datagram Protocol"          17
        }
        HCS "Header Checksum"                  16 Hex Data
        SA "Src Addr"                          32 DotNotation Data
        DA "Dest Addr"                         32 DotNotation Data
    }
}
```

What is claimed is:

1. A trigger sequence configuration display system for trigger definition development in a signal measurement system having a graphical user interface, the trigger configuration display system constructed and arranged to display in a visually associated manner a plurality of graphically selectable protocol layer icons and a protocol profile window corresponding to said protocol layer icons, wherein:

a) said graphically selectable protocol layer icons represent layers of protocol information accessed over communications data buses with said signal measurement system;

b) graphical selection of one of said graphically selectable protocol layer icons causes said protocol profile window to display protocol field information corresponding to said layer of protocol information;

c) said protocol field information display provides for operator editing of values useful for trigger definition development; and d) a trigger sequence is generated in response to an input from said graphical user interface.

2. The system of claim 1, wherein said protocol profile window is comprised of a protocol descriptors menu and a protocol editors menu.

3. The system of claim 2, wherein said protocol descriptors menu is comprised of a plurality of protocol field identifiers.

4. The system of claim 3, wherein said protocol editors menu comprises a plurality of input boxes, each of said plurality of input boxes corresponding to one of said plurality of protocol field identifiers.

5. The system of claim 2, wherein said protocol descriptors menu is visually adjacent to said protocol editors menu.

6. The system of claim 5, wherein said protocol editors menu is comprised of a plurality of text input boxes wherein each text input box corresponds to each protocol field identifier.

7. The system of claim 6, wherein said protocol profile window is further comprised of a format menu.

8. The system of claim 7, wherein said format menu is adjacent said editors menu and said format menu comprises of a plurality of format menu boxes corresponding to each field identifier.

9. The system of claim 1 wherein said trigger sequence comprises a plurality of trigger primitives.

10. A trigger sequence configuration display system for trigger definition development in a signal measurement system having a graphical user interface, the trigger configuration display system constructed and arranged to display in a visually associated manner a plurality of graphically selectable protocol layer icons and a protocol profile window associated with said protocol layer icons, wherein:

a) graphical selection of one of said protocol layer icons causes said protocol profile window to display graphical representations of protocol field information corresponding to said layer of protocol information;

b) said graphical representations of said protocol field information comprises a protocol descriptors menu and an associated protocol editors menu; and c) user editing of said protocol editors menu causes said signal measurement system to construct a signal measurement trigger sequence.

11. The system of claim 10, wherein signal measurement trigger sequence comprises a plurality of trigger primitives.

12. A trigger sequence configuration display system for trigger definition development in a signal measurement system having a graphical user interface, the trigger configuration display system constructed and arranged to display in a visually associated manner a plurality of graphically selectable protocol layer icons and a protocol profile window corresponding to said protocol layer icons, wherein:

a) said graphically selectable protocol layer icons represent layers of protocol information accessed over communications data buses with said signal measurement system;

b) graphical selection of one of said graphically selectable protocol layer icons causes said protocol profile window to display protocol field information corresponding to said layer of protocol information;

c) a plurality of event definitions are stored in a memory in the signal measurement system;
d) said protocol profile window provides for operator editing of values useful for trigger definition development; and
e) a trigger sequence is generated from said event definitions in response to inputs from said graphical user interface.

13. The system of claim 12, wherein said protocol profile window comprises a protocol descriptors menu and a protocol editors menu.

14. The system of claim 13, wherein said protocol descriptors menu comprises a plurality of protocol field identifiers.

15. The system of claim 3, wherein said protocol editors menu comprises a plurality of input boxes, each of said plurality of input boxes corresponding to one of said plurality of protocol field identifiers.

16. The system of claim 13, wherein said protocol descriptors menu is visually adjacent to said protocol editors menu.

17. The system of claim 16, wherein said protocol editors comprises a plurality of text input boxes wherein a text input box corresponds to each protocol field identifier.

18. The system of claim 17 wherein said protocol profile window is further comprised of a format menu.

19. The system of claim 18, wherein said format menu is adjacent said editors menu and said format menu is comprised of a plurality of format menu text boxes corresponding to each field identifier.

20. The system of claim 12, wherein said trigger sequence comprises a plurality of trigger primitives.

21. A trigger sequence configuration display system for trigger definition development in a signal measurement system having a graphical user interface, the trigger configuration display system constructed and arranged to display in a visually associated manner a plurality of graphically selectable protocol layer icons and a protocol profile window corresponding to said protocol layer icons, wherein:

a) said graphically selectable protocol layer icons represent layers of protocol information accessed over communications data buses with said signal measurement system;
b) said protocol profile window is comprised of a protocol descriptors menu and a protocol editors menu;
c) said protocol descriptors menu comprising a plurality of protocol field identifiers;
d) wherein said protocol descriptors menu is visually adjacent to said protocol editors menu and said protocol editors menu is comprised of a plurality of text input boxes wherein each text input box corresponds to one of said plurality of protocol field identifiers;
e) graphical selection of one of said graphically selectable protocol layer icons causes said protocol profile window to display protocol field information corresponding to said layer of protocol information;
f) a plurality of event definitions are stored in a memory in the signal measurement system;
g) said protocol editors menu provides for operator editing of values useful for trigger definition development; and
h) a series of trigger primitives is constructed from said event definitions in response to inputs from said graphical user interface.

* * * * *